United States Patent
Halle et al.

(10) Patent No.: US 11,568,101 B2
(45) Date of Patent: Jan. 31, 2023

(54) PREDICTIVE MULTI-STAGE MODELLING FOR COMPLEX PROCESS CONTROL

(71) Applicant: International Business Machines Corporation, Armonk, NY (US)

(72) Inventors: Scott Halle, Slingerlands, NY (US); Kyong Min Yeo, Scarsdale, NY (US); Robin Hsin Kuo Chao, Cohoes, NY (US); Derren Dunn, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/539,382

(22) Filed: Aug. 13, 2019

(65) Prior Publication Data
US 2021/0049241 A1 Feb. 18, 2021

(51) Int. Cl.
*G06F 30/20* (2020.01)
*G06F 17/16* (2006.01)
(Continued)

(52) U.S. Cl.
CPC .............. *G06F 30/20* (2020.01); *G06F 17/16* (2013.01); *G06F 17/18* (2013.01); *G06F 30/392* (2020.01)

(58) Field of Classification Search
CPC ........ G03F 7/705; G03F 1/36; G03F 7/70433; G03F 7/70633; G03F 7/70191;
(Continued)

(56) References Cited

U.S. PATENT DOCUMENTS 7,152,023 B2 12/2006 Das
8,682,454 B2 3/2014 Fuller et al.
(Continued)

OTHER PUBLICATIONS

Vincent et al., "Virtual fabrication and advanced process control improve yield for SAQP process assessment with 16 nm half-pitch," Proc. SPIE, Advanced Etch Technology for Nanopatterning VIII, 109630Q (Mar. 2019) (10 total pages).
(Continued)

*Primary Examiner* — Binh C Tat
(74) *Attorney, Agent, or Firm* — Abdy Raissinia; Michael J. Chang, LLC

(57) ABSTRACT

Predictive multi-stage modelling for complex semiconductor device manufacturing process control is provided. In one aspect, a method of predictive multi-stage modelling for controlling a complex semiconductor device manufacturing process includes: collecting geometrical data from metrology measurements made at select stages of the manufacturing process; and making an outcome probability prediction at each of the select stages using a multiplicative kernel Gaussian process, wherein the outcome probability prediction is a function of a current stage and all prior stages. Machine-learning models can be trained for each of the select stages of the manufacturing process using the multiplicative kernel Gaussian process. The machine-learning models can be used to provide probabilistic predictions for a final outcome in real-time for production wafers. The probabilistic predictions can then be used to select production wafers for rework, sort, scrap or disposition.

16 Claims, 6 Drawing Sheets

(51) Int. Cl.
*G06F 17/18* (2006.01)
*G06F 30/392* (2020.01)

(58) Field of Classification Search
CPC .... G03F 7/70291; G03F 7/70508; G03F 1/44; G03F 7/70616; G03F 1/84; G03F 7/70625; G03F 7/70425; G03F 7/70441; G03F 7/70458; G03F 7/70491; G03F 7/70516; G03F 7/70525; G03F 9/7003; G03F 1/26; G03F 9/7046; G06F 2119/18; G06F 30/398; G06F 2111/04; G06F 30/3323; G06F 30/39; G06F 30/392; G06F 17/16; G06F 17/18; G06F 30/00; G06F 30/20; G06F 17/10; G06F 17/11; G06F 2111/08; G06F 2119/02; G06F 30/3308; H01L 27/14632; H01L 27/14687; H01L 22/12; H01L 27/14618; H01L 27/14625; H01L 2924/00; G06N 20/00; G06N 20/10
USPC .......................................... 716/50–55, 50–56
See application file for complete search history.

(56) References Cited

U.S. PATENT DOCUMENTS

| | | | | |
|---|---|---|---|---|
| 8,732,627 | B2* | 5/2014 | Baseman | G06Q 10/04 |
| | | | | 716/50 |
| 9,928,316 | B2 | 3/2018 | Bailey et al. | |
| 9,991,156 | B2 | 6/2018 | Burns et al. | |
| 10,578,978 | B2* | 3/2020 | Saib | G03F 7/705 |
| 2014/0123084 | A1 | 5/2014 | Tang et al. | |
| 2014/0351773 | A1 | 11/2014 | Cao et al. | |
| 2015/0004721 | A1 | 1/2015 | Akimoto et al. | |
| 2016/0117812 | A1* | 4/2016 | Pandev | G06K 9/4604 |
| | | | | 382/149 |
| 2016/0365253 | A1 | 12/2016 | Chen et al. | |
| 2017/0061604 | A1* | 3/2017 | Pandev | G03F 7/70633 |
| 2017/0287751 | A1* | 10/2017 | Kuznetsov | G06N 20/00 |
| 2019/0049858 | A1* | 2/2019 | Gurevich | G03F 7/70633 |

OTHER PUBLICATIONS

Maslow et al., "Co-optimization of Exposure Dose and Etch process for SAQP Pitch walk control," Proc. SPIE 10587, Optical Microlithography XXXI, 1058704 (Mar. 2018) (15 total pages).

Wei C. Li et al., "A multistep, Newton-type control strategy for constrained, nonlinear processes," American Control Conference, Jun. 1989, pp. 1526-1527.

Ioannis Bonis et al., "A linear model predictive control algorithm for nonlinear large-scale distributed parameter systems," AIChE Journal, vol. 58, No. 3, Mar. 2012 (11 pages).

Christopher P. Ausschnitt et al., "Combinatorial overlay control for double patterning," Journal of Micro/Nanolithography, MEMS, and MOEMS, vol. 8, No. 1, Jan.-Mar. 2009, 011008 (8 pages).

* cited by examiner

PREDICTIVE MULTI-STAGE MODELLING FOR COMPLEX PROCESS CONTROL

FIELD OF THE INVENTION

The present invention relates to semiconductor device manufacturing process control, and more particularly, predictive multi-stage modelling for complex semiconductor device manufacturing process control.

BACKGROUND OF THE INVENTION

Semiconductor device manufacturing often involves a complex multi-stage fabrication process with many intermediate stages. While complex-highly coupled multi-stage process modules predicative modelling for yield outcomes is highly desired in manufacturing environments such as semiconductor fabrication, doing so has been difficult to implement and as such not currently practiced. By coupled, it is meant that stack description (i.e., structural measurements) stage (n+1) are dependent (and determined partially) on parameters from stage (n).

Thus, conventional methods for semiconductor device process control and disposition typically focus on single, individual stages of the manufacturing process. Such an approach, however, has some notable drawbacks. For instance, with complex multi-stage processes the metrology outcome may or may not be available for all of the intermediate stages. Further, the process model for complex coupled multi-stage processes can be either insufficient for accurate prediction of the outcome or contains too many variables for computational tractability.

Thus, single stage disposition is not sufficient for complex coupled multistep processes where the outcomes are not 'revealed' until significant processing has been performed. For example, the single stage disposition of a downstream step may reveal an outcome which is outside the process specification. However, this outcome may be detected too late for meaningful intervention, and the product has to be either re-worked or scrapped.

Therefore, predictive multistep modelling techniques for complex semiconductor device manufacturing process control would be desirable.

SUMMARY OF THE INVENTION

The present invention provides predictive multi-stage modelling for complex semiconductor device manufacturing process control. In one aspect of the invention, a method of predictive multi-stage modelling for controlling a complex semiconductor device manufacturing process is provided. The method includes: collecting geometrical data from metrology measurements made at select stages of the manufacturing process; and making an outcome probability prediction at each of the select stages of the manufacturing process using a multiplicative kernel Gaussian process, wherein the outcome probability prediction is a function of a current stage and all prior stages. Machine-learning models can be trained for each of the select stages of the manufacturing process using the multiplicative kernel Gaussian process. The machine-learning models can be used to provide probabilistic predictions for a final outcome in real-time for production wafers. The probabilistic predictions can then be used to select production wafers for rework, sort, scrap or disposition.

A more complete understanding of the present invention, as well as further features and advantages of the present invention, will be obtained by reference to the following detailed description and drawings.

DETAILED DESCRIPTION OF PREFERRED EMBODIMENTS

As provided above, semiconductor device manufacturing often involves a complex multi-stage fabrication process with many intermediate stages. See, for example, FIG. 1 where a fabrication process is schematically depicted as proceeding from a Stage 1 to a Stage n, with multiple intermediate stages therebetween, to produce outcome Y. Conventional methods for semiconductor device process control and disposition typically focus on single, individual stages of the manufacturing process. For instance, in the current practice (e.g., in semiconductor manufacturing), for single step stages n, geometrical structural outcomes $X_i$(i=1, n) can be measured with state of the art metrology process and are used for process control and may be dispositioned only for each individual stage n according to model $Y \sim f_n(X_1, X_2, X_3)$ with process specification for $X_1, X_2, X_3$ where Y is the predicted outcome for each stage. According to an exemplary embodiment, the data (parameters) for both input and outcomes used for the present techniques are obtained using semiconductor fabrication metrology tools known in the art such as scanning electron micrograph (SEM) imaging, thin film measurements, overlay measurements, optical critical dimension measurements and/or scatterometry measurements.

Figure 1:
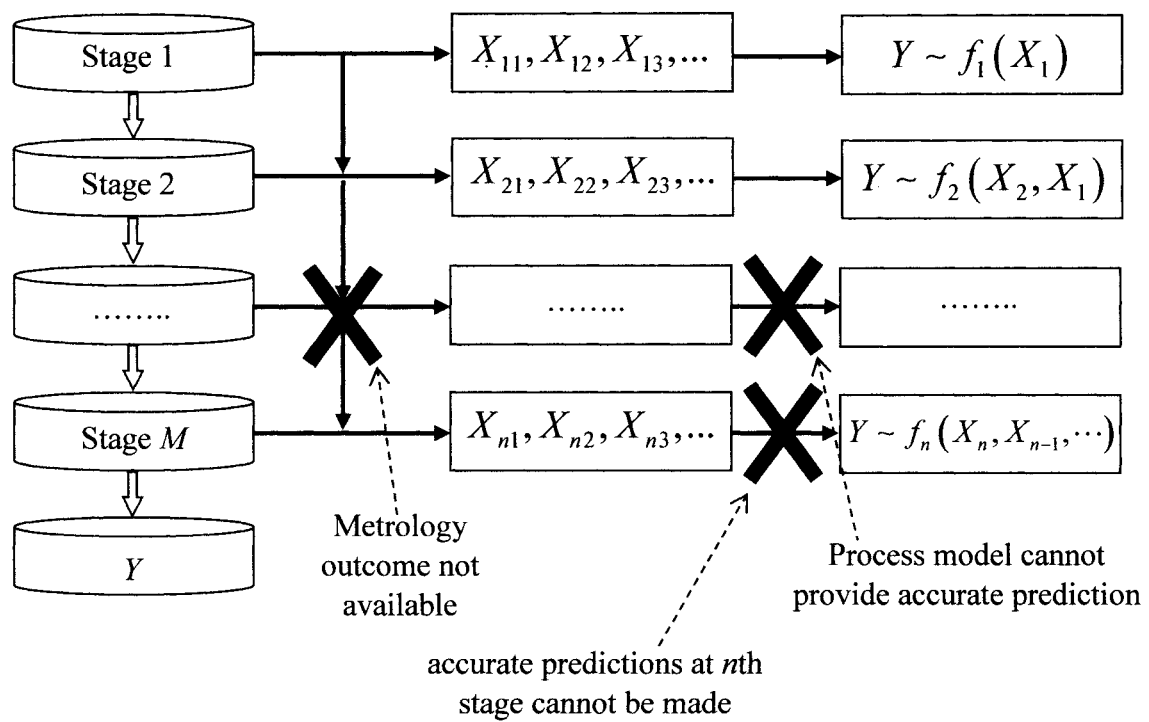
FIG. 1 is a diagram schematically illustrating a semiconductor device manufacturing process.

However, as shown in FIG. 1 the outcome (from which measurement data is obtained) may not be available for all of the intermediate stages due, e.g., to cost considerations. For instance, adding more metrology stages in a manufacturing process metrology stages to get more measurements, will slow down the production process and add to the manufacturing costs. Therefore, extra measurement stages are generally minimized, unless they are deemed critical to controlling a given process stage. Additionally, the process model for complex coupled multi-stage processes can be either insufficient for accurate prediction of the outcome or contains too many variables for computational tractability. Based on these drawbacks, an accurate outcome prediction for the nth stage cannot be made using the conventional process.

With a complex multi-stage semiconductor device fabrication process, steps are coupled to each other and oftentimes the end results do not reveal themselves until the end of the process. At that point, however, the product has to be either extensively re-worked or scrapped. Thus, predicting output is essential to enable meaningful intervention and control of the process.

Advantageously, provided herein are efficient and effective techniques for leveraging the measurement data that is available. Namely, for each stage where outcome data is available, a model-based prediction of the nth stage outcome is achieved. For instance, referring to the fabrication process depicted in FIG. 1, at each single stage where geometrical structural outcomes $X_i$(i=1,n) are measured with state of the art metrology tools, this measurement data is used to make a process model prediction $Y \sim f_n(X_n, X_{n-1}, \ldots)$ for the nth stage using a Gaussian process. As such, the drawbacks of the conventional process of not being able to make accurate predictions at the nth stage due to a lack of measurement data (see FIG. 1) is overcome.

For illustrative purposes only, reference is made herein to specific examples of a semiconductor fabrication process such as Self-Aligned Quadruple Patterning (SAQP). SAQP involves the deposition, patterning, etc. of multiple materials in a variety of different steps. Thus, SAQP is a good example of a complex semiconductor device manufacturing process that can be controlled via the present predictive multistep modelling.

With SAQP it may not always be apparent what impact, if any, a certain parameter (such as the thickness of a given spacer) has on what downstream outcome, and what is the magnitude of that impact. By way of the present techniques, a user can determine which of the multi parameters of the SAQP process to tune in order to achieve a desired downstream outcome.

SAQP is a process that can be employed to pattern features at pitches smaller than achievable using direct patterning. Namely, SAQP enables the patterning of wider features, followed by two successive cycles of spacer deposition, spacer etch, and core removal. SAQP generally involves first forming mandrels on a substrate, forming Spacers 1 on opposite sides of the mandrels, removing the mandrels, forming Spacers 2 on opposite sides of the Spacers 1, removing Spacers 1, and then using Spacers 2 as a hardmask to pattern the substrate. Based on this process, there are four Spacers 2 for each mandrel initially formed on the substrate. Thus, SAQP is a pitch quadrupling process. Other pitch multiplying processes that can be optimized using the present techniques include, but are not limited to, sidewall image transfer (SIT) which employs two spacers for every mandrel formed, and thus is a pitch doubling process. Further increases to the pattern density through SAQP can be achieved using top mandrels (TM) and bottom mandrels (BM) which repeat the above-described spacer formation and pattern transfer steps at multiple (top/bottom) levels of the patterning structure.

While SAQP allows patterning at sub-lithographic pitches, it also involves more process steps, more complex interactions of the associated lithography and etching processes, and hence more chances for variation. One such process variation is pitch walking (PW). Pitch walking occurs when the lithography, material deposition and/or etching process involved in SAQP generates a repeating, non-uniform grating of space and line critical dimensions. While an SAQP is a good example to use to illustrate methodology 200, it is to be understood that the present techniques are more broadly applicable to any stochastic process including, but not limited to, processes involved in semiconductor fabrication.

Consider, for example, a sequential semiconductor device manufacturing process such as SAQP which involves a sequence of manufacturing stages T and a target variable y, i.e., $T_1 \to T_2 \to \ldots T_M \to y$. At the end of each stage T, a set of geometric features is measured, i.e., $T_i \mapsto x_i$ and $x_i \cap x_j = \emptyset$ for all $i \neq j$.

According to an exemplary embodiment, a Gaussian Process (GP) is used for the prediction of the target y. By way of example only, the target variable y in the problem of SAQP-based fin field effect transistor (FET) FinFET manufacturing is pitch walking (PW). For instance, in one embodiment, at each manufacturing stage T, pitch walking is predicted as:

$$T_1: p(y^* \mid X_1^*, X_1), \qquad (1)$$

$$T_2: p(y^* \mid X_{1:2}^*, X_{1:2}), \qquad (2)$$

$$\ldots$$

$$T_M: p(y^* \mid X_{1:M}^*, X_{1:M}), \qquad (3)$$

wherein $X_{1:j}=(X_1, \ldots, X_j)$ and $X_i=(x_i^1, \ldots, x_i^n)$ denote the training (historical) data of size n and $X^*_{1:j}=(x^*_1, \ldots, x^*_j)$ are measurements from the current stage.

As highlighted above, standard modelling approaches build separate models for every stage. For instance, at each manufacturing stage a Gaussian Process (GP) provides $$p(y^* \mid X^*_{1:j}, X_{1:j}, Y) = N(y^* \mid \mu_j, \lambda_j), \qquad (4)$$

where $Y=(y^1, \ldots, y^n)$ is the target variable in the training data set, $N(\cdot \mid \mu, \lambda)$ denotes the Normal distribution with expectation $\mu$ and precision $\lambda$. The expectation $\mu$ p and precision $\lambda$ are computed as:

$$\mu_j = K(X^*_{1:j}, X_{1:j})[K(X_{1:j}, X_{1:j}) + \sigma I]^{-1} Y, \qquad (5)$$

$$\lambda_j = k(X^*_{1:j}, X^*_{1:j}) - K(X^*_{1:j}, X_{1:j})[K(X_{1:j}, X_{1:j}) + \sigma I]^{-1} K^T (X^*_{1:j}, X_{1:j}). \qquad (6)$$

Here, $k(\cdot, \cdot)$ is a kernel function. By way of example only, a radial basis kernel is used, i.e., $$k(X^*_{1:j}, X^*_{1:j}) = v \exp\left[-\sum_{i=1}^{j} x_i^{*T} L_i x_i^*\right], \qquad (7)$$

wherein v is a parameter and $L_i$ is a diagonal matrix, $\text{diag}(L_i)=(l_i^1, \ldots, l_i^{q_i})$, wherein $q_i$ is the total number of features measured at the i-th manufacturing stage. $K(\cdot, \cdot)$ is a matrix of the kernel functions $k(\cdot, \cdot)$.

With conventional approaches, one builds and maintains M separate models. However, in a downstream process, $X_{1:j}$ becomes so large that model training requires a large amount of data or becomes very difficult to train. Namely, the total number of parameters needed to maintain all of the M separate models is:

$$N_{GP} = 2M + \sum_{i=1}^{M}(M-i+1)q_i. \quad (8)$$

For instance, using a 10-stage manufacturing process as an illustrative example, if 5 variables are measured at each stage then the total number of model parameters becomes $N_{GP}=295$. Namely, if $q_i$ is defined as the number of parameters per stage, and M is the number of stages, then for M=10 and $q_i=5$ it is a straightforward sequence to add (5+10+15+ . . . +45+2(10)=295).

Figure 2:
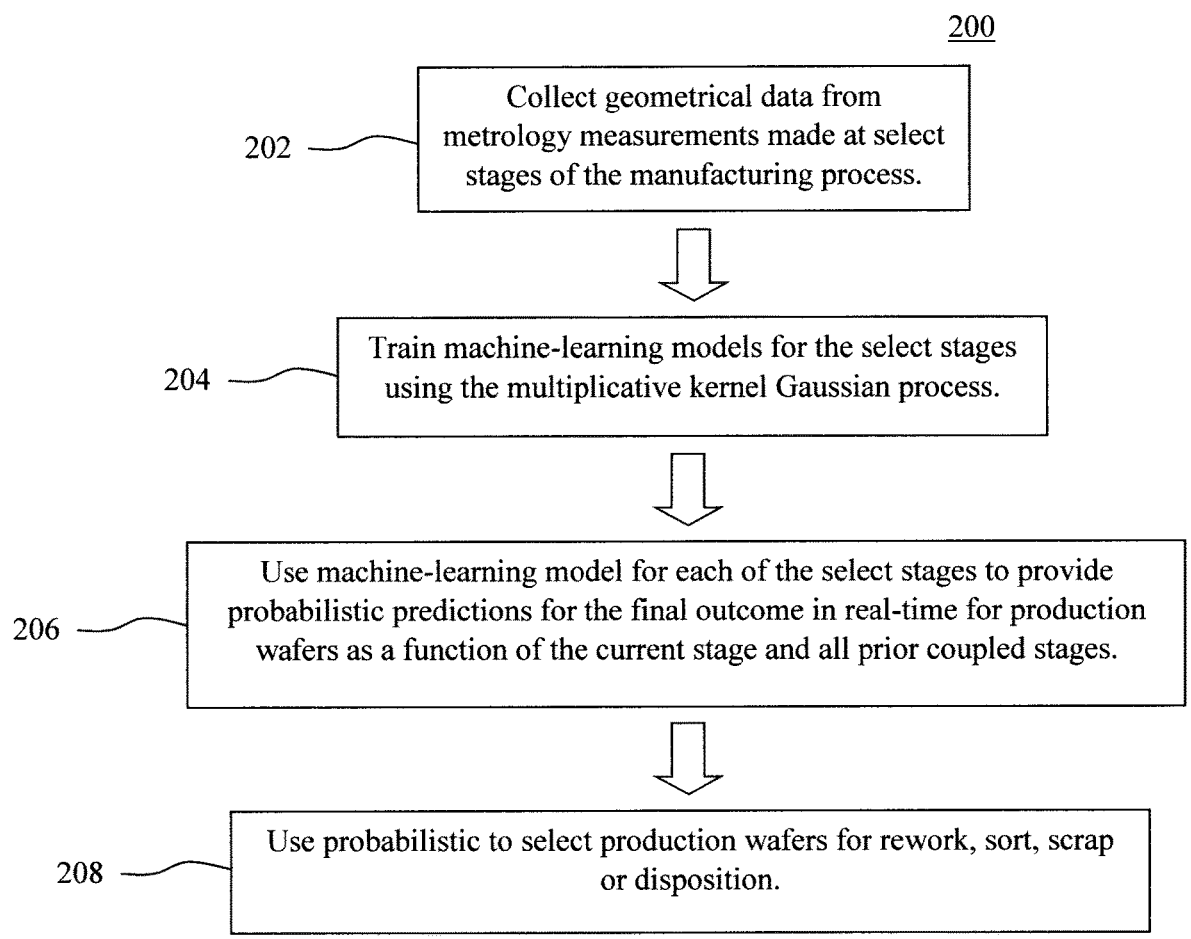
FIG. 2 is a diagram illustrating an exemplary methodology of predictive multi-stage modelling for controlling a complex semiconductor device manufacturing process according to an embodiment of the present invention.

Advantageously, the present techniques overcome the difficulties of the conventional approach, using a multiplicative kernel for the Gaussian Process. See, for instance, exemplary methodology 200 of FIG. 2 for predictive multi-stage modelling for controlling a complex semiconductor device manufacturing process. As will be described in detail below, the goal of methodology 200 is to make a prediction of the target variable y at the end of each stage of the complex multi-stage fabrication process (such as pitch walk in a SAQP process) in order to decide, as early in the process as possible, whether (or not) the output of the process will be within specifications (pass/fail). Namely, for a conventional approach the target variable would be the prediction of the value for each stage only. However, with the present techniques, the target variable is the outcome prediction (i.e., pitch walk) determined at each and every stage. As will be described in conjunction with the description of FIG. 6, below, pitch walking can be quantitatively defined.

The prediction is made using a set of input geometric data coming from metrology measurements made at select stages in the manufacturing process. As highlighted above, due for example to cost concerns, metrology measurements are often made only at those select stages deemed critical to controlling a given process stage according to some specification. For instance, using SAQP as an example measurement stages are selected at meaningful process stages (top mandrel, bottom mandrel, etc.).

As provided above, the geometric data (parameters) for both input and outcomes used for the present techniques can be obtained using semiconductor fabrication metrology tools known in the art such as SEM imaging, thin film measurements, overlay measurements, optical critical dimension measurements and/or scatterometry measurements. For instance, measurements used for the SAQP process can include, but are not limited to, the following extract geometric parameters from OCD and SEM metrology: mandrel height, mandrel top critical dimension (CD), mandrel bottom CD, mandrel sidewall angle, nitride thickness, spacer thickness, spacer bottom thickness and/or fin space widths.

Thus, the process begins in step 202 by collecting geometrical data from metrology measurements made at select stages of the manufacturing process. An exemplary methodology for collecting the geometrical data from the manufacturing process is described in conjunction with the description of FIG. 3, below. According to an exemplary embodiment, the cross fold validation is then used to 'randomly' split up the geometrical data into training and validation sets, whereby this random splitting is done in n different ways to prevent overfilling of the model.

An outcome probability prediction (e.g., either pass or fail) is made at each select stage of the manufacturing process using the geometrical data, whereby the outcome probability at each stage is a function of the current stage j and all of the coupled prior stages (i.e., complex, multi-stage processes such as SAQP oftentimes involve parameters that show some level of correlation to each other and to the process outcome). See also, FIG. 5, described below.

Namely, like conventional approaches, the present techniques compute a predictive distribution, i.e., $$p(y^*|X^*_{1,j},X_{1,j},Y)=N(y^*|\mu_j,\lambda_j), \text{ for } j=1,\ldots,M, \quad (9)$$

at each stage of the manufacturing process. However, the expectation $\mu$ and precision $\lambda$ here are computed by a multiplicative kernel $s_j(\cdot,\cdot)$, i.e., $$\mu_j = S_j(X^*_{1,j},X_{1,j})[S_j(X_{1,j})+\sigma_j I]^{-1}Y, \text{ and} \quad (10)$$

$$\lambda_j = s_j(X^*_{1,j},X^*_{1,j}) - S_j(X^*_{1,j},X_{1,j})[S_j(X_{1,j},X_{1,j})+\sigma_j I]^{-1}S_j^T(X^*_{1,j},X_{1,j}), \quad (11)$$

wherein $S_j$ denotes a matrix of the multiplicative kernel, $s_j(\cdot,\cdot)$. Here, the multiplicative kernel is computed as:

$$s_0=1, \quad (12)$$

$$s_j(X^*_{1,j},X^*_{1,j}) = s_{j-1}(X^*_{1,j-1},X^*_{1,j-1})k_j(x^*_j,x^*_j), \quad (13)$$

in which $$k_j(x^*_j,x^*_j) = v_j \exp[-x^*_j{}^T L_j x^*_j]. \quad (14)$$

Thus, the present techniques involve making multi-stage predictions of the outcome of a semiconductor manufacturing process (e.g., pitch walking in an SAQP process) which get more accurate with each prediction since the data is sequentially accumulated from the previous stages. Namely, as highlighted above, these outcome probability predictions made at each metrology stage of the manufacturing process are a function of the current stage and all prior stages. Therefore, the accuracy increases with each prediction since it involves the data recycled from all previous stage/predictions. See, for example, FIG. 6, described below.

According to an exemplary embodiment, the multiplicative kernel Gaussian process is used to train supervised machine-learning models for each of the metrology stages. See step 204. The trained machine-learning models can then be used at each stage of the manufacturing process to give probabilistic predictions for the final outcome in real-time during an actual fabrication process which, based on a given outlier criteria, can be used to identify wafers for rework or have reasonable confidence for sort, scrap, or disposition.

During the model training, the following set of optimization problems is sequentially solved to compute the parameters:

$$\arg\max_{v_j,L_j,\sigma_j} \frac{1}{2}Y^T[S_{j-1} \odot K_j + \sigma_j I]^{-1}Y + \frac{1}{2}\log|S_{j-1} \odot K_j + \sigma_j I|, \quad (15)$$

$$\text{for } j=1,\cdots,M$$

where $$S_{j-1}=S_{j-1}(X_{1,j-1},X_{1,j-1}), K_j=K_j(X_j,X_j). \quad (16)$$

Note that $S_{j-1}$ is already known from the previous stages and the optimization problem is solved only for the parameters at stage j. Contrary to the conventional approach, the number of total model parameters for the multiplicative GP is:

$$N_{mul-GP} = 2M + \sum_{i=1}^{M} q_i. \qquad (17)$$

For example, with a 10-stage manufacturing process where 5 variables are measured at each stage, the number of model parameters is $N_{mul-GP}=70$, compared to $N_{GP}=295$ of the conventional approach. In the example, the conventional approach needs to solve a 52-dimensional optimization problem to train a GP at the last stage ($T_M$), while the present techniques solve only for a 7-dimensional optimization problem.

In step 206, the trained machine-learning model for each stage of the manufacturing process, along with metrology data (see above) collected from production wafers during an actual run of the manufacturing process, is used to provide probabilistic predictions for the final outcome (e.g., either pass or fail) in real-time for the production wafers at each stage. As detailed above, these outcome probability predictions are a function of the current stage and all prior coupled stages (based on the multiplicative kernel Gaussian process). In step 208, from the probabilistic assessments, outlier criteria can be chosen to select wafers for rework or have reasonable confidence for sort, scrap or disposition. According to an exemplary embodiment, the outlier criteria is chosen at the manufacturing process specification (e.g., pitch walk ($\sigma$)<3 nm. For instance, as will be described in conjunction with the description of FIG. 5 below, at each stage the prediction of pitch walk variance improves. Thus, an assessment can be made at each stage.

Those production wafers that are to be scrapped are removed from production and discarded. Advantageously, this determination is made via the present techniques as early on in the fabrication process as possible, before additional costs are incurred by processing a non-viable sample wafer. Likewise, those production wafers identified as needing rework are tagged early in the process, before further steps are performed potentially making them unusable. As such, once the determination is made that a wafer needs rework (e.g., in real-time see above), that wafer can be removed from production and adjustments made accordingly.

Figure 3:
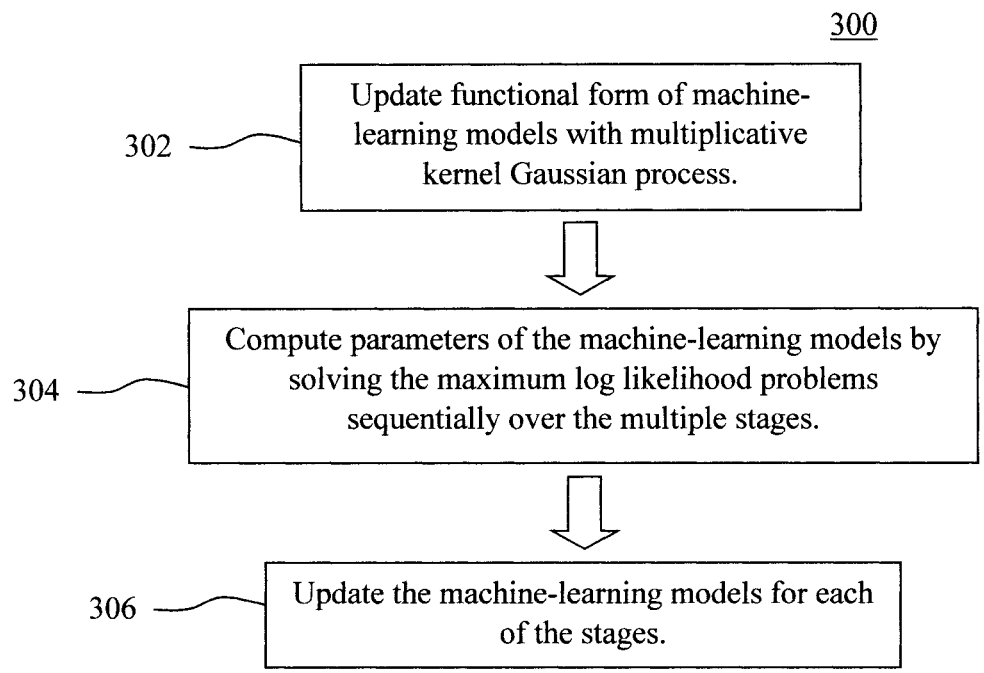
FIG. 3 is a diagram illustrating an exemplary methodology for training supervised machine-learning models using a multiplicative kernel Gaussian process according to an embodiment of the present invention.

FIG. 3 illustrates an exemplary methodology 300 for training supervised machine-learning models using the multiplicative kernel Gaussian process as described in conjunction with the description of step 204 of methodology 200, above. In step 302, the functional form of the machine-learning model of the given stage is updated with multiplicative kernel Gaussian process. For instance, in step 302 the kernel at stage J is computed as $S_J=S_{J-1}*K_J$ (see Equation 13, above). In step 304, the parameters of the machine-learning models are computed by solving maximum log likelihood problems sequentially over the multiple metrology stages. See, for example, Equations 15 and 16, above. For instance, in step 304 the parameters of the kernel $S_J$ are computed by solving Equations 15 and 16 above. Since the parameters up to $S_{J-1}$, are already computed in the previous stage, only the parameters related with $K_J$ are computed. Finally, in step 306, the machine-learning models for each of the select metrology stages are updated (i.e., using the computed parameters of $K_J$ is step 304).

As provided above, the metrology measurements for methodology 200 are made at select stages in the manufacturing process, meaning that it is anticipated herein that complete measurement data may not be available at all stages of the manufacturing process. See, for example, methodology 400 for collecting the geometrical data.

In step 402, a set of geometric parameters specific to each metrology stage of the manufacturing process is defined. For instance, a metrology measurement is performed at selected process stages. For the metrology measurement, a variety of geometric parameters are determined which characterize the state of the semiconductor feature constructs at each stage of the process, for example, the thickness of a sidewall oxide or the sidewall angle of a particular film. To use an SAQP process as an illustrative, non-limiting example, according to an exemplary embodiment, the geometric parameters defined in step 402 include, but are not limited to, mandrel height, mandrel top CD, mandrel bottom CD, mandrel sidewall angle, nitride thickness, spacer thickness, spacer bottom thickness and/or fin space widths.

In step 404, data values for the geometric parameters are measured from actual sample wafers for each metrology stage of the manufacturing process. As provided above, metrology tools such as SEM imaging, thin film measurements, overlay measurements, optical critical dimension measurements and/or scatterometry measurements can be used to obtain these data values. For instance, according to an exemplary embodiment, an SAQP process is performed on multiple wafers, and at each metrology stage the relevant geometric parameters are measured using SEM, thin film, overlay, optical critical dimension and/or scatterometry measurements.

Preferably, the data values are measured at the same given location(s) on each sample wafer at each metrology stage. For instance, according to an exemplary embodiment, each sample wafer is measured at the select metrology stages at multiple locations over many wafer samples. For a technology process flow, the number of chips that are used for metrology of the total number of chips is pre-determined based on a variety of factors including, but not limited to, lithographic and patterning quadrant sampling, proximity to chips that are electrically diagnostically tested, and the cost of testing. Additionally, for a given technology, the number of wafers per lot is preferably predetermined.

In step 406, a data culling process is used to remove poorly determined parameters and generate a complete data set. For instance, by way of example only, data values can be removed that do not have a complete set of measurements across the selected metrology stages. Namely, as provided above, measurements can be made at the same given location(s) on each sample wafer at each metrology stage. For a given stage, if the measurements made at a given location are missing or otherwise unusable, then the measurement values for that stage/location are incomplete and can be discarded from the data set in step 406.

Figure 5:
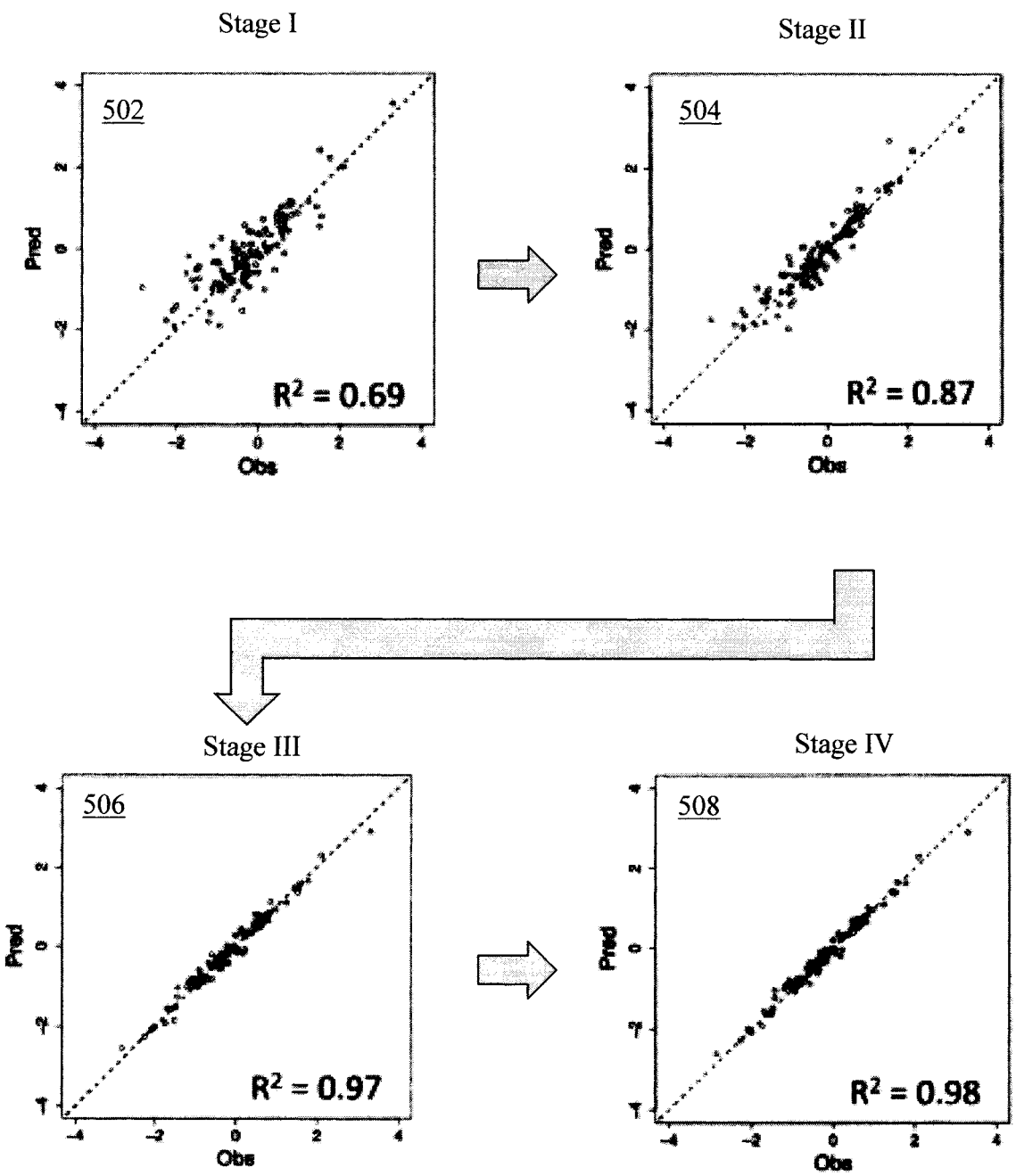
FIG. 5 is a diagram illustrating how multi-stage predictions of the final outcome of a semiconductor manufacturing process made as a function of the current stage and all prior stages increase in accuracy along the various stages of the semiconductor device manufacturing process according to an embodiment of the present invention.

As described in detail above, the present techniques involve making multi-stage predictions of the final outcome of a semiconductor manufacturing process (e.g., pitch walking in an SAQP process) as a function of the current stage and all prior stages. Thus, since the data gets sequentially accumulated from the previous stages, the predictions become more accurate as you go along. This concept is illustrated in FIG. 5. FIG. 5 provides a series of plots 502-508 depicting the final outcome prediction made at stage I-stage IV of the manufacturing process, respectively. As shown in FIG. 5, there is an improvement in the prediction with more metrology data being collected at each stage. Thus, an assessment can be made at each stage.

As provided above, complex, multi-stage processes such as SAQP oftentimes involve parameters that show some level of correlation to each other and to the process outcome.

Figure 6:
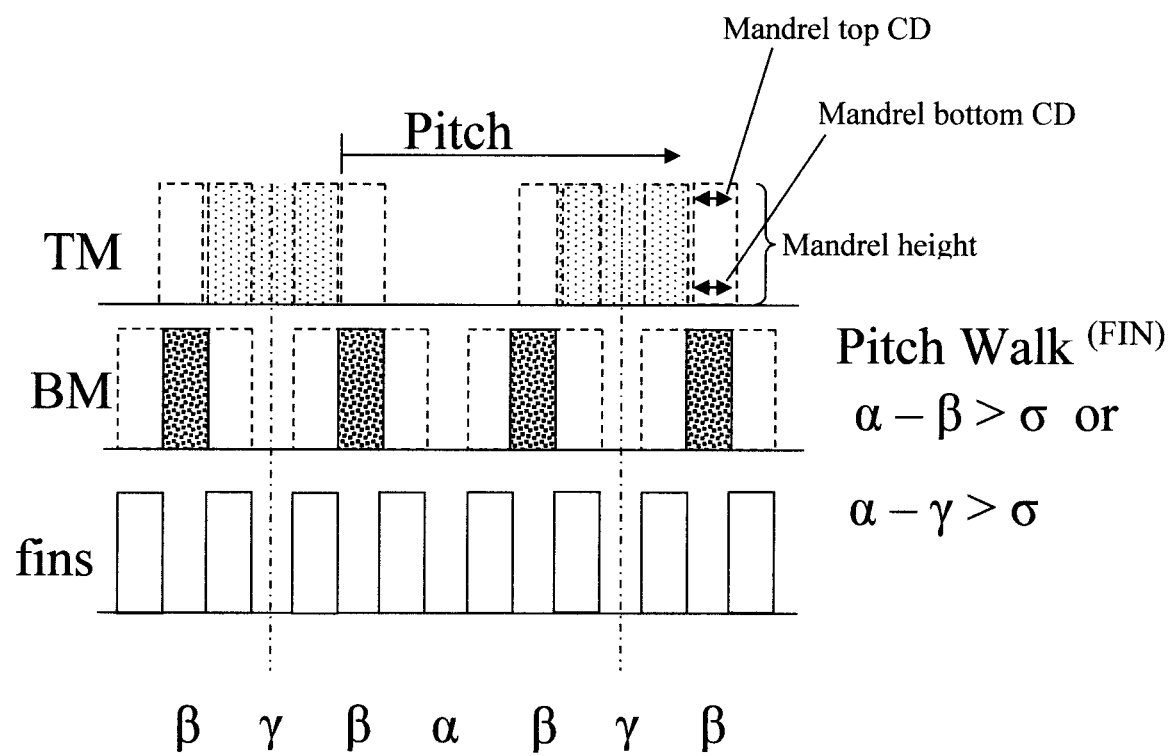
FIG. 6 is a diagram illustrating a highly coupled, complex self-aligned quadruple patterning (SAQP) process according to an embodiment of the present invention.

For instance, the highly coupled, complex SAQP process is shown illustrated in FIG. 6. As shown in FIG. 6, top mandrels (TM) and bottom mandrels (BM) are used at multiple (top/bottom) levels of the patterning structure to increase the pattern density of the resulting fins. As described above, SAQP involves forming spacers (not shown) on opposite sides of the mandrels, and then selectively removing the mandrels. This process is performed at both the top and bottom levels with the top mandrels (TM) and bottom mandrels (BM), respectively.

As shown in FIG. 6, SAQP is a highly coupled process where the parameters at one stage affect those in other stages, as well as the process outcome. Take for instance the top and bottom CD of the top mandrel (TM). These parameters affect the dimensions of the bottom mandrels (BM), which in turn affect the dimensions and pitch walk variance in the resulting fins. Unfortunately, with conventional approaches the pitch walk variance is not often revealed until a significant amount of processing has already been performed.

As also shown in FIG. 6, pitch walking is quantitatively defined. Namely, pitch walking is present when $\alpha-\beta>\sigma$ or when $\alpha-\gamma>\sigma$, wherein $\sigma$ is standard deviation. The variance of the pitch walking process is decided by a process specification (e.g., $\sigma=2$ nanometers (nm)).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
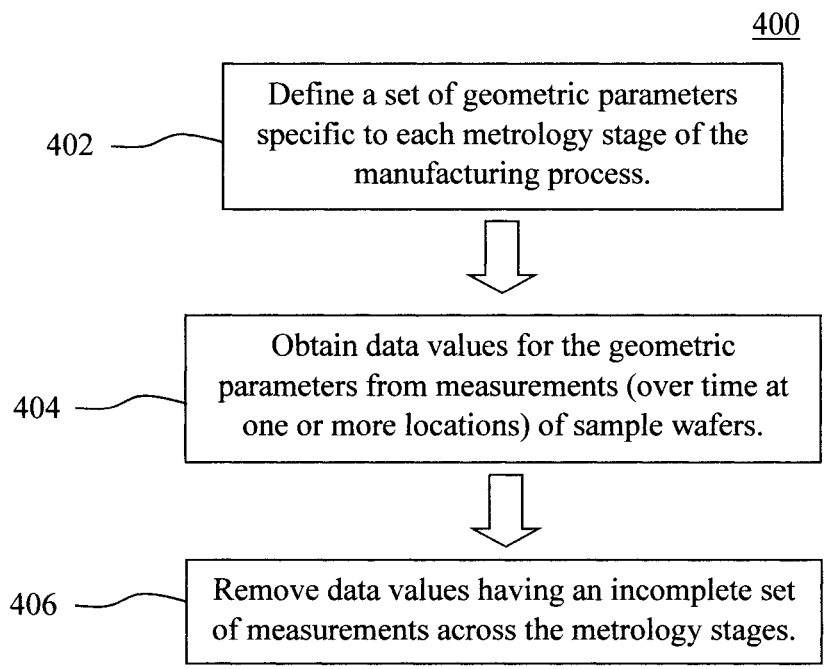
FIG. 4 is a diagram illustrating an exemplary methodology for collecting the geometrical data according to an embodiment of the present invention.
Figure 7:
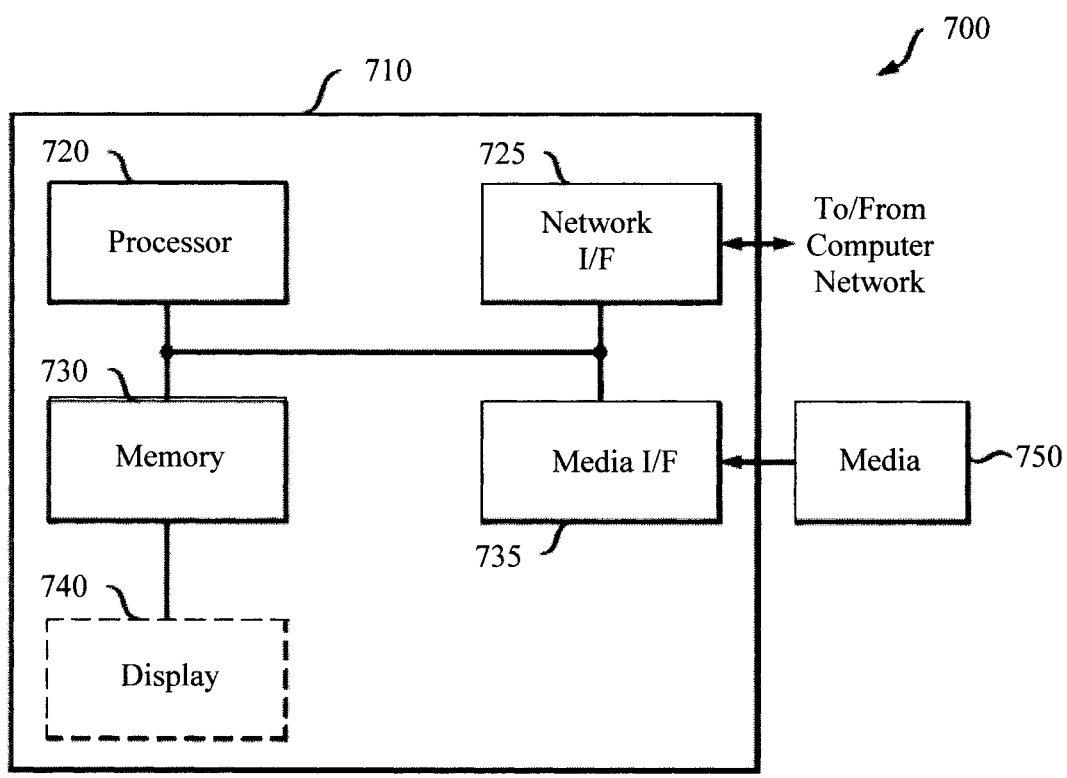
FIG. 7 is a diagram illustrating an exemplary apparatus that can be employed in carrying out one or more of the present techniques according to an embodiment of the present invention.

Turning now to FIG. 7, a block diagram is shown of an apparatus 700 for implementing one or more of the methodologies presented herein. By way of example only, apparatus 700 can be configured to implement one or more of the steps of methodology 200 of FIG. 2, one or more of the steps of methodology 300 of FIG. 3 and/or one or more steps of methodology 400 of FIG. 4.

Apparatus 700 includes a computer system 710 and removable media 750. Computer system 710 includes a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method of predictive multi-stage modelling for controlling a complex semiconductor device manufacturing process, the method comprising the steps of:

collecting geometrical data from metrology measurements made of production wafers at select stages of the manufacturing process;

making an outcome probability prediction as to whether an output of the manufacturing process is within specifications at each of the select stages of the manufacturing process by machine-learning models trained for each of the select stages of the manufacturing process using a multiplicative kernel Gaussian process, wherein the outcome probability prediction is a function of a current stage and all prior stages; and using the outcome probability prediction from the machine-learning models to identify those of the production wafers needing to be reworked or scrapped which are then removed from production, wherein the method further comprises the steps of:

using the machine-learning models for each of the select stages of the manufacturing process to provide probabilistic predictions for a final outcome in real-time for the production wafers; and using the probabilistic predictions to select the production wafers for rework, sort, scrap or disposition.

2. The method of claim 1, wherein the manufacturing process comprises a self-aligned quadruple patterning (SAQP) process performed during fin field-effect transistor (finFET) fabrication.

3. The method of claim 2, wherein the geometrical data is selected from the group consisting of: mandrel height, mandrel top critical dimension (CD), mandrel bottom CD, mandrel sidewall angle, nitride thickness, spacer thickness, spacer bottom thickness, fin space widths, and combinations thereof.

4. The method of claim 1, wherein the step of making the outcome probability prediction, further comprises the step of:

computing a predictive distribution $p(y^*|X^*_{1:j}, X_{1:j}, Y) = N(y^*|\mu_j, \lambda_j)$, for $j=1, \ldots, M$ for each of the select stages of the manufacturing process, wherein expectation $\mu$ and precision $\lambda$ are computed by a multiplicative kernel $s_j(\cdot, \cdot)$, wherein $\mu_j = S_j(X^*_{1:j}, X_{1:j})[S_j(X_{1:j}) + \sigma_j I]^{-1} Y$, wherein $\lambda_j = s_j(X^*_{1:j}, X^*_{1:j}) - S_j(X^*_{1:j}, X_{1:j})[S_j(X_{1:j}, X_{1:j}) + \sigma_j I]^{-1} S_j^T(X^*_{1:j}, X_{1:j})$, and wherein $S_j$ denotes a matrix of the multiplicative kernel $s_j(\cdot, \cdot)$.

5. The method of claim 4, further comprising the step of:

computing the multiplicative kernel $s_j(\cdot, \cdot)$ as $s_j(X^*_{1:j}, X^*_{1:j}) = s_{j-1}(X^*_{1:j-1}, X^*_{1:j-1}) k_j(x^*_j, x^*_j)$, wherein $k_j(x^*_j, x^*_j) = v_j \exp[-x^{*T}_j L_j x^*_j]$.

6. The method of claim 1, further comprising the steps of:

defining geometric parameters specific to each stage of the manufacturing process;

obtaining data values for the geometric parameters from measurements made of sample wafers at each stage of the manufacturing process; and removing data values having an incomplete set of measurements across the select stages.

7. The method of claim 6, wherein the measurements are made of the sample wafers using a semiconductor fabrication metrology tool selected from the group consisting of: scanning electron micrograph (SEM) imaging, thin film measurements, overlay measurements, optical critical dimension measurements, scatterometry measurements, and combinations thereof.

8. A method of predictive multi-stage modelling for controlling a complex semiconductor device manufacturing process, the method comprising the steps of:

collecting geometrical data from metrology measurements made of production wafers at select stages of the manufacturing process;

training machine-learning models for each of the select stages of the manufacturing process using a multiplicative kernel Gaussian process;

using the machine-learning models for each of the select stages of the manufacturing process to provide probabilistic predictions for a final outcome in real-time for the production wafers, wherein the probabilistic predictions are a function of a current stage and all prior stages; and using the probabilistic predictions to identify those of the production wafers needing to be reworked or scrapped which are then removed from production.

9. The method of claim 8, wherein the manufacturing process comprises a SAQP process performed during finFET fabrication.

10. The method of claim 9, wherein the geometrical data is selected from the group consisting of: mandrel height, mandrel top CD, mandrel bottom CD, mandrel sidewall angle, nitride thickness, spacer thickness, spacer bottom thickness, fin space widths, and combinations thereof.

11. The method of claim 8, further comprising the step of:

computing a predictive distribution $p(y^*|X^*_{1:j}, X_{1:j}, Y) = N(y^*|\mu_j, \lambda_j)$ for $j=1, \ldots, M$ for each of the select stages of the manufacturing process, wherein expectation $\mu$ and precision $\lambda$ are computed by a multiplicative kernel $s_j(\cdot, \cdot)$, wherein $\mu_j = S_j(X^*_{1:j}, X_{1:j})[S_j(X_{1:j}) + \sigma_j I]^{-1} Y$, wherein $\lambda_j = s_j(X^*_{1:j}, X^*_{1:j}) - S_j(X^*_{1:j}, X_{1:j})[S_j(X_{1:j}, X_{1:j}) + \sigma_j I]^{-1} S_j^T(X^*_{1:j}, X_{1:j})$, and wherein $S_j$ denotes a matrix of the multiplicative kernel $s_j(\cdot, \cdot)$.

12. The method of claim 11, further comprising the step of:

computing the multiplicative kernel $s_j(\cdot, \cdot)$ as $s_j(X^*_{1:j}, X^*_{1:j}) = s_{j-1}(X^*_{1:j-1}, X^*_{1:j-1}) k_j(x^*_j, x^*_j)$, wherein $k_j(x^*_j, x^*_j) = v_j \exp[-x^{*T}_j L_j x^*_j]$.

13. The method of claim 8, further comprising the steps of:

defining geometric parameters specific to each stage of the manufacturing process;

obtaining data values for the geometric parameters from measurements made of sample wafers at each stage of the manufacturing process; and removing data values having an incomplete set of measurements across the select stages.

14. The method of claim 13, wherein the measurements are made of the sample wafers using a semiconductor fabrication metrology tool selected from the group consisting of: SEM imaging, thin film measurements, overlay measurements, optical critical dimension measurements, scatterometry measurements, and combinations thereof.

15. A computer program product of predictive multi-stage modelling for controlling a complex semiconductor device manufacturing process, the computer program product comprising a computer readable storage medium having program instructions embodied therewith, the program instructions executable by a computer to cause the computer to perform the steps of:

collecting geometrical data from metrology measurements of production wafers made at select stages of the manufacturing process;

making an outcome probability prediction as to whether an output of the manufacturing process is within specifications at each of the select stages of the manufacturing process by machine-learning models trained for each of the select stages of the manufacturing process using a multiplicative kernel Gaussian process, wherein the outcome probability prediction is a function of a current stage and all prior stages; and using the outcome probability prediction from the machine-learning models to identify those of the production wafers needing to be reworked or scrapped which are then removed from production, and wherein the program instructions further cause the computer to perform the steps of:

using the machine-learning models for each of the select stages of the manufacturing process to provide probabilistic predictions for a final outcome in real-time for the production wafers; and using the probabilistic predictions to select the production wafers for rework, sort, scrap or disposition.

16. The computer program product of claim 15, wherein the program instructions further cause the computer to perform the steps of:

defining geometric parameters specific to each stage of the manufacturing process;

obtaining data values for the geometric parameters from measurements made of sample wafers at each stage of the manufacturing process, wherein the measurements are made of the sample wafers using a semiconductor fabrication metrology tool selected from the group consisting of: SEM imaging, thin film measurements, overlay measurements, optical critical dimension measurements, scatterometry measurements, and combinations thereof; and removing data values having an incomplete set of measurements across the select stages.

\* \* \* \* \*